UNITED STATES PATENT OFFICE.

RASMUS VON PETERSEN, OF COPENHAGEN, DENMARK.

MOISTURE-PROOF COATING AND COVERING FOR WALLS, FLOORS, &c.

SPECIFICATION forming part of Letters Patent No. 258,829, dated May 30, 1882.

Application filed March 11, 1882. (No specimens.)

*To all whom it may concern:*

Be it known that I, RASMUS VON PETERSEN, a subject of His Majesty the King of Denmark, residing at the city of Copenhagen, in the Kingdom of Denmark, have invented certain new and useful Improvements in Moisture-Proof Coating and Covering Materials for Walls, Floors, &c.; and I do declare the following to be a full, clear, and exact description of the invention, such as will enable others skilled in the art to which it appertains to make and use the same.

My invention has relation to materials for coating or covering the walls or floors of buildings, the floors of cellars or areas, and other surfaces that are exposed to the weather, or to atmospherical and meteorological influences; and it consists in the compound or composition hereinafter specifically described and claimed, which, when melted, assumes a fluid state, so that it may be readily spread over the surfaces to be protected by it.

To prepare this material I melt in a suitable boiler or other vessel a suitable quantity of bitumen—that is, mineral pitch or natural asphalt—and mix with it, when it is in a fluid state, a suitable quantity of comminuted cork. The cork may be ground more or less fine, and its proportion to the asphalt will vary with circumstances. For general purposes, however, I prefer to use equal quantities (by volume, not by weight) of asphalt and cork; but I do not confine myself to any precise proportion of the two materials. These are thoroughly mixed by stirring to form one homogeneous mass, which is molded into bricks or blocks of suitable size for handling in the market as an article of manufacture. When it is desired to use the material a suitable quantity of these bricks or blocks is melted and the compound is spread upon the surfaces to be covered or coated with a brush. The admixture of the comminuted cork to the asphalt does not diminish the strength and solidity of the last-named material, but makes it less brittle and much tougher than it is in its natural state. The compound hardens quickly, and forms a smooth, tough, and perfectly damp-proof coating, which may be papered or painted any desired colors. The compound will adhere firmly to wood, stone, brick, or metals of all kinds, and, as it is not only water-proof, but is a poor conductor of heat, may be advantageously used with or without an admixture of gravel, lime, asbestus, or litharge as a coating for roofs.

I am aware that comminuted cork or cork waste has been mixed before with a variety of ingredients—such as caoutchouc, gutta-percha, resin, tar, papier-maché, and similar substances, but such mixtures or compounds I do not claim; nor do I claim broadly providing the walls and ceilings of rooms or structures generally with an elastic or resilient surface integral with the wall or ceiling; but What I do claim, and desire to secure by Letters Patent of the United States, is—

1. The herein-described compound or composition for coating floors, walls, roofs, and other surfaces, consisting of natural asphalt or bitumen and comminuted cork mixed in suitable proportions, as set forth.

2. As an article of manufacture, a mixture of natural asphalt or bitumen and comminuted cork molded into bricks or blocks of suitable size, as set forth.

In testimony whereof I have hereto affixed my signature in presence of two witnesses.

RASMUS VON PETERSEN.

Witnesses:
   FREDERIK WOLFF,
   R. P. BERGGREEN.